United States Patent
Chen et al.

(10) Patent No.: US 7,075,685 B2
(45) Date of Patent: Jul. 11, 2006

(54) SCANNING DEVICE THAT IS COOPERATED WITH PROJECTOR

(76) Inventors: Michael Chen, 5F, No.4, Nung 1, Lane 57, Ming Hu Rd., Hsin-Chu (TW); Brian Shih, 1F, No. 78, Lane 476, Sec. 1, Kuang Fu Rd., Hsin-Chu (TW)

( * ) Notice: Subject to any disclaimer, the term of this patent is extended or adjusted under 35 U.S.C. 154(b) by 1042 days.

(21) Appl. No.: 10/055,045

(22) Filed: Jan. 25, 2002

(65) Prior Publication Data

US 2003/0033458 A1   Feb. 13, 2003

(30) Foreign Application Priority Data

Aug. 13, 2001   (TW) ............................. 90213774 U

(51) Int. Cl.
  *H04N 1/04*   (2006.01)
  *H04N 1/32*   (2006.01)
  *G03B 21/14*   (2006.01)

(52) U.S. Cl. ............... 358/474; 497/442; 497/468; 497/444; 497/527; 353/199; 353/122; 353/17

(58) Field of Classification Search ............. 358/474, 358/497, 494, 527, 442, 468, 434, 444; 353/122, 353/17, 119; 382/312, 318, 319
See application file for complete search history.

(56) References Cited

U.S. PATENT DOCUMENTS

| | | | |
|---|---|---|---|
| 6,386,711 B1 * | 5/2002 | Petruchik et al. | 353/122 |
| 2002/0175915 A1 * | 11/2002 | Lichtfuss | 345/440 |
| 2004/0095562 A1 * | 5/2004 | Moffatt | 353/122 |
| 2005/0024608 A1 * | 2/2005 | Chou | 353/122 |

FOREIGN PATENT DOCUMENTS

EP   0686939 B1   1/2000

* cited by examiner

*Primary Examiner*—Cheukfan Lee

(57) ABSTRACT

A scanning device which is connected to a projector for displaying the scanned images. The scanning module scans documents and the scanned images are processed by a CPU controlled by the user interface. Thus, the signal process unit, memory and output unit can be activated. The scanned images are processed by the signal process unit, the memory, and a video buffer. Then, the scanned images are transferred to a projector via the output unit. The connection between the projector and the scanner is simplified and convenient for the users.

14 Claims, 4 Drawing Sheets

SCANNING DEVICE THAT IS COOPERATED WITH PROJECTOR

FIELD OF THE INVENTION

The present invention relates to a scanning device that can be connected to a projector so as to show the scanned images.

BACKGROUND OF THE INVENTION

A projector is usually used during displaying figures or descriptions in a meeting or seminar. There are two types of projectors, one of which is the optical projector and the other is the LCD projector. The optical projector is used for displaying static images and the LCD projector can be cooperated with computers so as to display images having special effects made by the computers.

The LCD projector projects the images on the monitor of the computer onto the screen. When the LCD projector is used, a computer is connected to the projector and an electronic file in the computer can be easily projected on the screen.

If the image or data is not prepared in the form of the electronic file, the image or data can be copied on a project sheet and then projected onto a screen. Alternatively, scanning the images or data by a scanner and sending the scanned data to a computer, which is then cooperated with an LCD projector, can do the projecting process.

The project sheets are necessary when using the optical projector. A copy machine is also necessary for copying the images to the project sheets. The used project sheets are discarded and could result in environmental concerns. A computer is necessary when cooperating with a scanner and an LCD projector. It is, however, a complicated work to use these appliances.

SUMMARY OF THE INVENTION

The primary object of the present invention is to provide a scanning device that can be connected to a projector so as to display the scanned images. The scanner is used to scan documents and obtain scanned images. Then the scanned images are processed and sent to the projector and projected onto a screen. Thereby, the image process and the connection between the projector and the scanner are simplified and convenient for the users.

Another object of the present invention is to provide a scanning device that can be connected to a projector so as to display the scanned images. The scanned images are processed and stored in a memory so as to be displayed as desired ways.

Yet another object of the present invention is to provide a scanning device that can be connected to a projector so as to display the scanned images. The scanning device is equipped with a storing device for storing the images, or the electronic data are read from the storing device, and then the images or electronic data are sent to the projector for displaying.

The present invention will become more obvious from the following description when taken in connection with the accompanying drawings, which show for purposes of illustration only, preferred embodiments in accordance with the present invention.

DETAILED DESCRIPTION OF THE PREFERRED EMBODIMENTS

Figure 1:
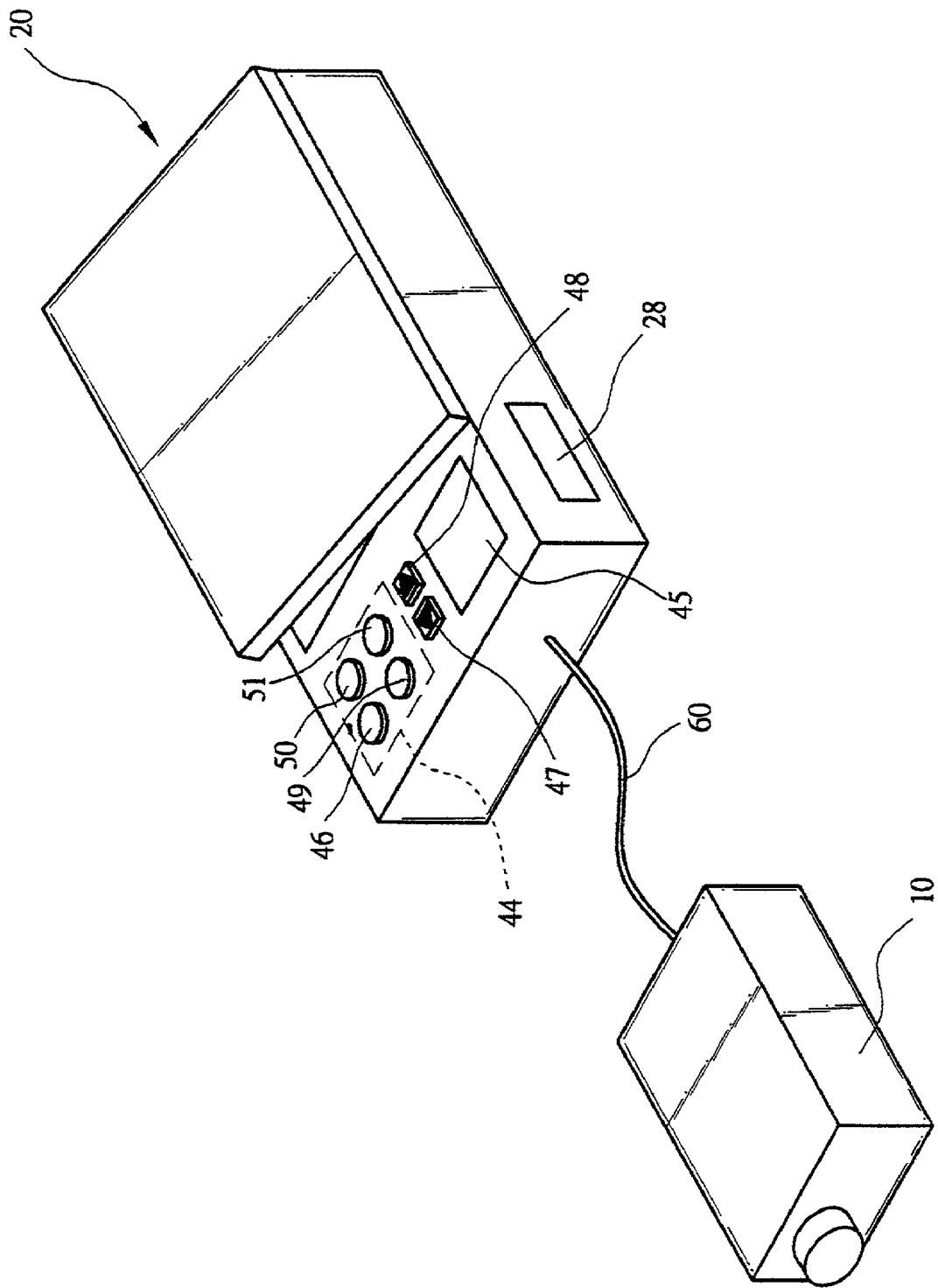
FIG. 1 is an illustrative view to show the connection of the first embodiment of the scanner of the present invention and a projector.

Referring to FIG. 1, which shows the connection between a scanner 20 of a first embodiment of the present invention and a projector 10. A cable 60 is used to connect between the scanner 20 and the projector 10. The scanner 20 can scan documents and obtain scanned images. The scanned images are transferred to the projector 10 via the cable 60, and the scanned images are then projected onto a screen (not shown).

The interact portion between the scanner 20 and the users includes a control portion 44 which provides button functions, and a display panel 45 for displaying information. The control portion 44 and the display panel 45 are also called as a user interface 27. The control portion 44 includes a scanning button 46, option buttons 47 and 48, a read button 49, a play button 50, and a save button 51.

Figure 2:
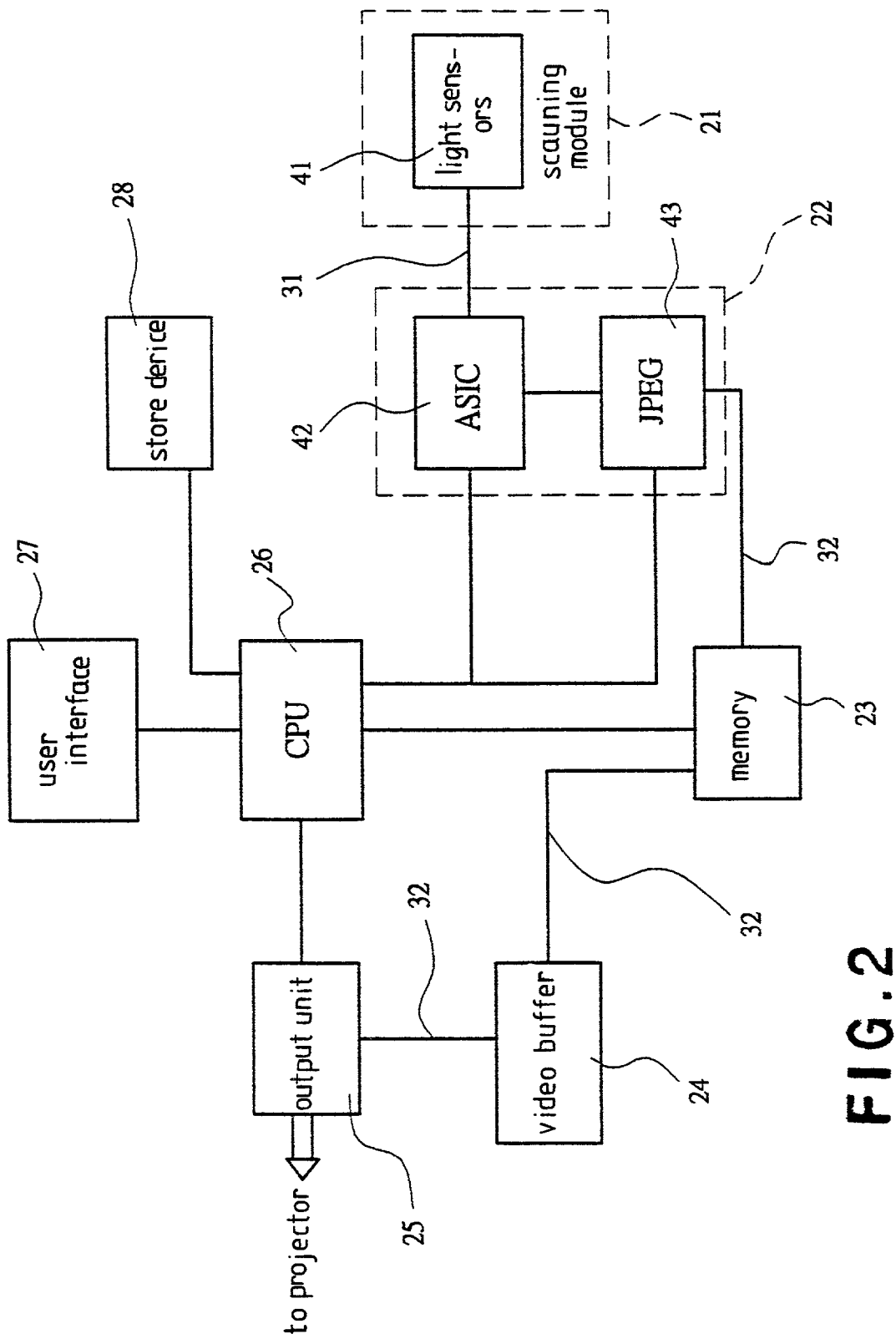
FIG. 2 shows a block diagram of an interior structure of the scanner of the present invention.

FIG. 2 shows the block diagram of the interior structure of the preferred embodiment of the scanner 20. The scanner 20 includes a scanning module 21, a signal process and control unit 22, a memory 23, a video buffer 24, an output unit 25, a CPU 26, a user interface 27 and a store device 28. The scanning module 21 includes multiple light sensors 41. The signal process and control unit 22 includes an application specific integrated circuit (ASIC) 42 and a joint photographic expert group (JPEG) chip 43. The ASIC 42 controls the operation of the scanning module 21, and the JPEG chip 43 processes (such as compresses) the image signals from the light sensors 41.

Referring to FIGS. 1 and 2, when the user pushes the scanning button 46, a signal is sent from the user interface 27 to control the CPU 26. The CPU 26 controls the ASIC 42 to drive the scanning module 21 to scan the image(s). The scanning module 21 obtains a first scanned image 31 by the light sensors 41. After the processes by the ASIC 42 and JPEG chip 43, the first scanned image 31 becomes a second scanned image 32, and then the second scanned image 32 is transferred to and saved in the memory 23.

When the user pushes the play button 50, the user interface 27 sends signals to control the second scanned image 32 that is saved in the memory 23, and to transfer the second scanned image 32 to the video buffer 24. The transfer mode between the memory 23 and the video buffer 24 can be performed by the direct memory access (DMA). An alternative way is that the CPU 26 reads the second scanned image 32 from the memory 23, and sends the second scanned image 32 to the video buffer 24. Then the second scanned image 32 in the video buffer 24 is sent to the output unit 25 and processed to become a third scanned image 33, and then the third scanned image 33 is sent to the projector 10. The transfer interface between the output unit 25 and the projector 10 can be the VGA interface, AV interface or DVI interface.

It is to be noted that if the memory 23 is large enough, the user may scan multiple documents by using an automatic document feeder or placing the documents manually. The user pushes the option buttons 47 and 48 to choose desired images, and then displays the chosen images by pushing the play button 50.

Besides, when the user pushes the save button 51, the user interface 27 sends a signal to control the CPU 26, and under the control of CPU 26, the second scanned image 32 is transferred from the memory 23 to the store device 28. The store device 28 can be floppy disks, hard disks, compact disks, or memory cards. By this way, the user may take them with him/her.

In addition to the data storage, the scanner 20 may transfer the electronic data in the store device 28 to the projector 10 that may display the data. When the user pushes the read button 49, the user interface 27 controls the CPU 26 to read electronic data in the store device 28, and then the electronic data are sent to and saved in the memory 23 as the second scanned images 32. The second scanned images 32 are then passed to the projector 10 as explained hereinbefore.

Figure 3:
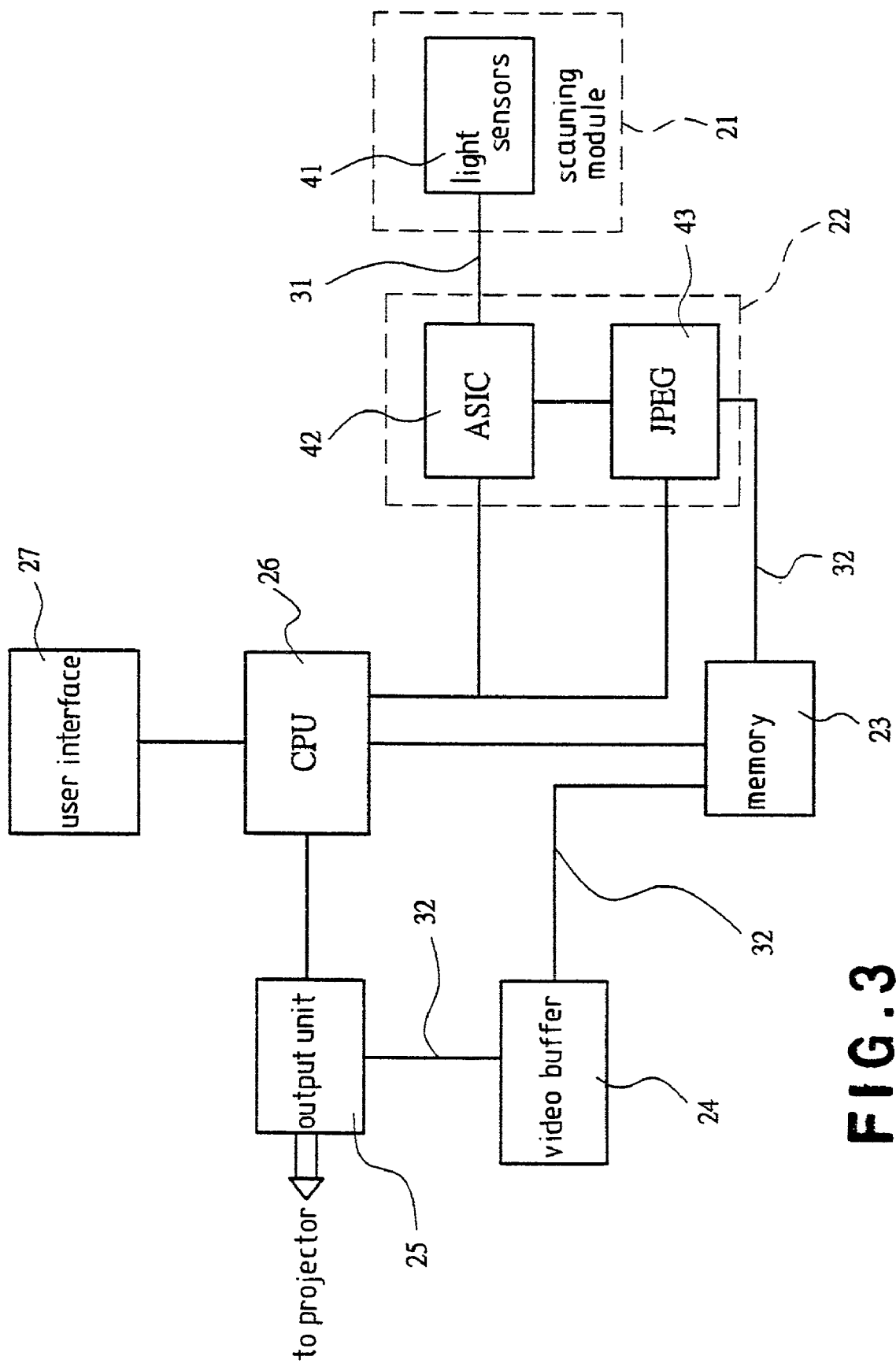
FIG. 3 shows a block diagram of an interior structure of a second embodiment of the scanner of the present invention.

FIG. 3 shows a block diagram of the interior structure of a second embodiment of the scanner 20. The scanner 20 also includes the scanning module 21, the signal process and control unit 22, the memory 23, the video buffer 24, the output unit 25, the CPU 26 and the user interface 27.

What is different from the first embodiment is that the store device 28 is not an essential item. The steps of operation of the second embodiment are the same as those of the first embodiment. Therefore, by the same operation mode such as the first embodiment, the second embodiment can achieve the scanning function and the projecting function.

Figure 4:
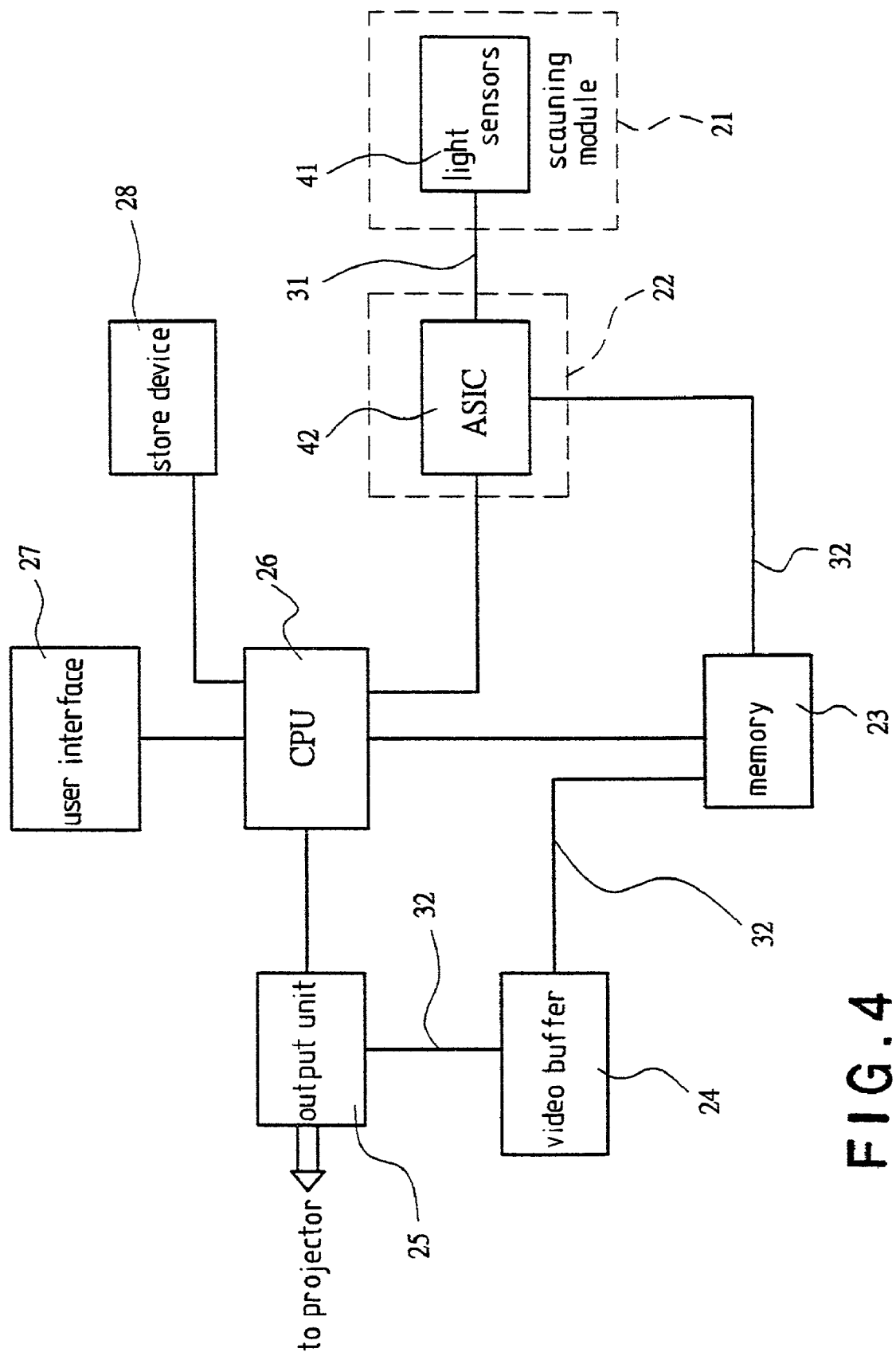
FIG. 4 shows a block diagram of an interior structure of a third embodiment of the scanner of the present invention.

FIG. 4 shows a block diagram of the interior structure of a third embodiment of the scanner 20. The scanner 20 also includes the scanning module 21, the signal process and control unit 22, the memory 23, the video buffer 24, the output unit 25, the CPU 26, the user interface 27 and the store device 28. What is different from the first embodiment is that the signal process and control unit 22 includes only the application specific integrated circuit (ASIC) 42. Therefore, it is not necessarily to use the JPEG chip 43 to compress data if the memory 23 is large enough. The steps of operation of the third embodiment are the same as those of the first embodiment.

So, during the meeting or seminar, the users can use the scanner to scan printed documents, books, magazines and newspapers, and transfer the scanned image to the projector. That is, the users may project the scanned images onto a screen without using a computer. Therefore, by using the scanner of present invention, the users do not need to make project sheets for an optical projector. Accordingly, it is convenient for the users to project images by using the scanner of the present invention.

While we have shown and described the embodiments in accordance with the present invention, it should be clear to those skilled in the art that further embodiments may be made without departing from the scope of the present invention.

What is claimed is:

1. A scanning device connectable to a projector, the scanning device comprising:
    a scanning module for scanning at least one document and obtaining a first scanned image;
    a signal processing and control unit for receiving and processing said first scanned image so as to obtain a second scanned image;
    a memory for receiving and saving said second scanned image;
    a video buffer for receiving said second scanned image;
    an output unit for receiving and processing said second scanned image from said video buffer and sending a third scanned image to the projector;
    a CPU for controlling said signal processing and control unit, said memory, said output unit; and
    a user interface controlled by users and connected with said CPU for controlling said CPU.

2. The device as claimed in claim 1, wherein said user interface includes a scanning button which is controlled by the users to scan the at least document.

3. The device as claimed in claim 2, wherein said user interface includes option buttons for the users to choose at least one part of said second scanned image sent from said memory.

4. The device as claimed in claim 3, wherein said user interface includes a display button for the users to transfer at least one part of said second scanned image in said memory to said projector.

5. The device as claimed in claim 1, further comprising a store device connected to said CPU, said CPU processing said second scanned image from said memory and saving said second scanned image in said store device.

6. The device as claimed in claim 5, wherein said user interface includes:
    a scanning button which is controlled by the users to scan the at least one document; and
    a save button which is controlled by the users to save said second scanned image from said memory to said store device.

7. The device as claimed in claim 6, wherein said user interface includes option buttons which are controlled by the users to save at least one part of said second scanned image from said memory to said store device.

8. The device as claimed in claim 1, further comprising a store device connected to said CPU, said store device having electronic data saved therein, said CPU receiving signals from said user interface so as to process said electronic data from said store device, and said processed data being transferred to said memory as said second scanned image.

9. The device as claimed in claim 1, wherein said signal processing and control unit includes an application specific integrated circuit for controlling said scanning module and receiving said first scanned image from said scanning module.

10. The device as claimed in claim 9, wherein said signal processing and control unit includes a JPEG chip for compressing said first scanned image from said application specific integrated circuit so as to obtain a second scanned image and to send said second scanned image to said memory.

11. The device as claimed in claim 1, wherein said output unit includes a DVI interface.

12. The device as claimed in claim 1, wherein said output unit includes a VGA interface.

13. The device as claimed in claim 1, wherein said output unit includes an AV interface.

14. The device as claimed in claim 1, further comprising an automatic document feeder for feeding multiple sheets to be scanned by the scanning device.

* * * * *